(12) United States Patent
Donovan et al.

(10) Patent No.: US 12,019,756 B1
(45) Date of Patent: *Jun. 25, 2024

(54) AUTOMATED CYBER EVALUATION SYSTEM

(71) Applicant: Architecture Technology Corporation, Eden Prairie, MN (US)

(72) Inventors: Matthew Donovan, Ithaca, NY (US); Scott Aloisio, Ithaca, NY (US); Judson Powers, Ithaca, NY (US)

(73) Assignee: Architecture Technology Corporation, Eden Prairie, MN (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/870,575

(22) Filed: Jul. 21, 2022

Related U.S. Application Data

(63) Continuation of application No. 16/455,254, filed on Jun. 27, 2019, now Pat. No. 11,403,405.

(51) Int. Cl.
G06F 21/57 (2013.01)
G06F 8/53 (2018.01)
(Continued)

(52) U.S. Cl.
CPC .............. *G06F 21/577* (2013.01); *G06F 8/53* (2013.01); *G06F 9/54* (2013.01); *G06N 20/00* (2019.01)

(58) Field of Classification Search
CPC .................................................. G06F 21/577
See application file for complete search history.

(56) References Cited

U.S. PATENT DOCUMENTS 4,895,518 A  1/1990  Arnold et al.
5,115,433 A  5/1992  Baran et al.
(Continued)

FOREIGN PATENT DOCUMENTS

CN  101075917 A  11/2007
CN  106709613 A  5/2017
(Continued)

OTHER PUBLICATIONS

"Cybersecurity", U.S. Department of Defense Instruction, No. 8500.01, Mar. 14, 2014, incorporating change effective Oct. 7, 2019, accessible at URL: https://www.esd.whs.mil/Portals/54/Documents/DD/issuances/dodi/850001_2014.pdf (58 pages).
(Continued)

*Primary Examiner* — Simon P Kanaan
(74) *Attorney, Agent, or Firm* — Foley & Lardner LLP

(57) ABSTRACT

Embodiments disclosed herein describe systems and methods for assessing vulnerabilities of embedded non-IP devices. In an illustrative embodiment, a system of assessing the vulnerabilities of embedded non-IP devices may be within a portable device. The portable device may include a plurality of wired connectors for various wired communication/data transfer protocols. The portable device may include tools for analyzing the firmware binaries of the embedded non-IP devices, such as disassemblers and modules for concrete and symbolic (concolic) execution. Based upon the disassembly and the concolic execution, the portable device may identify vulnerabilities such as buffer overflows and programming flaws in the firmware binaries.

20 Claims, 3 Drawing Sheets

(51) Int. Cl.
*G06F 9/54* (2006.01)
*G06N 20/00* (2019.01)

(56) References Cited

U.S. PATENT DOCUMENTS

| | | |
|---|---|---|
| 5,440,723 A | 8/1995 | Arnold et al. |
| 5,601,432 A | 2/1997 | Bergman |
| 5,944,783 A | 8/1999 | Nieten |
| 5,974,549 A | 10/1999 | Golan |
| 5,974,579 A | 10/1999 | Lepejian et al. |
| 6,088,804 A | 7/2000 | Hill et al. |
| 6,345,283 B1 | 2/2002 | Anderson |
| 6,477,683 B1 | 11/2002 | Killian et al. |
| 6,658,481 B1 | 12/2003 | Basso et al. |
| 6,985,476 B1 | 1/2006 | Elliott et al. |
| 7,058,968 B2 | 6/2006 | Rowland et al. |
| 7,107,347 B1 | 9/2006 | Cohen |
| 7,228,566 B2 | 6/2007 | Caceres et al. |
| 7,234,168 B2 | 6/2007 | Gupta et al. |
| 7,257,630 B2 | 8/2007 | Cole et al. |
| 7,317,733 B1 | 1/2008 | Olsson et al. |
| 7,325,252 B2 | 1/2008 | Bunker et al. |
| 7,372,809 B2 | 5/2008 | Chen et al. |
| 7,496,959 B2 | 2/2009 | Adelstein et al. |
| 7,522,908 B2 | 4/2009 | Hrastar |
| 7,694,328 B2 | 4/2010 | Joshi et al. |
| 7,743,074 B1 | 6/2010 | Parupudi et al. |
| 7,748,040 B2 | 6/2010 | Adelstein et al. |
| 7,818,804 B2 | 10/2010 | Marceau |
| 7,886,049 B2 | 2/2011 | Adelstein et al. |
| 7,925,984 B2 | 4/2011 | Awe et al. |
| 7,930,353 B2 | 4/2011 | Chickering et al. |
| 7,962,961 B1 | 6/2011 | Griffin et al. |
| 8,079,080 B2 | 12/2011 | Borders |
| 8,156,483 B2 | 4/2012 | Berg et al. |
| 8,176,557 B2 | 5/2012 | Adelstein et al. |
| 8,250,654 B1 | 8/2012 | Kennedy et al. |
| 8,266,320 B1 | 9/2012 | Bell et al. |
| 8,296,848 B1 | 10/2012 | Griffin et al. |
| 8,307,444 B1 | 11/2012 | Mayer et al. |
| 8,321,437 B2 | 11/2012 | Lim |
| 8,341,732 B2 | 12/2012 | Croft et al. |
| 8,407,801 B2 | 3/2013 | Ikegami et al. |
| 8,433,768 B1 | 4/2013 | Bush et al. |
| 8,458,805 B2 | 6/2013 | Adelstein et al. |
| 8,490,193 B2 | 7/2013 | Sarraute Yamada et al. |
| 8,495,229 B2 | 7/2013 | Kim |
| 8,495,583 B2 | 7/2013 | Bassin et al. |
| 8,499,354 B1 | 7/2013 | Satish et al. |
| 8,554,536 B2 | 10/2013 | Adelman et al. |
| 8,615,807 B1 | 12/2013 | Higbee et al. |
| 8,862,803 B2 | 10/2014 | Powers et al. |
| 8,869,235 B2 | 10/2014 | Qureshi et al. |
| 8,893,278 B1 | 11/2014 | Chechik |
| 9,076,342 B2 | 7/2015 | Brueckner et al. |
| 9,081,911 B2 | 7/2015 | Powers et al. |
| 9,083,741 B2 | 7/2015 | Powers |
| 9,137,325 B2 | 9/2015 | Muhunthan et al. |
| 9,197,649 B2 | 11/2015 | Carvalho |
| 9,208,323 B1 | 12/2015 | Karta et al. |
| 9,225,637 B2 | 12/2015 | Ramanujan et al. |
| 9,246,936 B1 | 1/2016 | Belani et al. |
| 9,280,911 B2 | 3/2016 | Sadeh-Koniecpol et al. |
| 9,325,728 B1 | 4/2016 | Kennedy et al. |
| 9,344,444 B2 | 5/2016 | Lippmann et al. |
| 9,384,677 B2 | 7/2016 | Brueckner et al. |
| 9,626,414 B2 | 4/2017 | Kanjirathinkal et al. |
| 9,742,803 B1 | 8/2017 | Kras et al. |
| 9,749,360 B1 | 8/2017 | Irimie et al. |
| 9,836,598 B2 | 12/2017 | Iyer et al. |
| 9,882,912 B2 | 1/2018 | Joo |
| 10,079,850 B1 | 9/2018 | Patil et al. |
| 10,083,624 B2 | 9/2018 | Brueckner et al. |
| 10,223,760 B2 | 3/2019 | Ananthanpillai et al. |
| 10,291,634 B2 | 5/2019 | Arzi et al. |
| 10,291,638 B1 | 5/2019 | Chandana et al. |
| 10,409,995 B1 | 9/2019 | Wasiq et al. |
| 10,467,419 B1 | 11/2019 | Youngberg et al. |
| 10,469,519 B2 | 11/2019 | Irimie et al. |
| 10,540,502 B1 | 1/2020 | Joyce et al. |
| 10,558,809 B1 | 2/2020 | Joyce et al. |
| 10,581,868 B2 | 3/2020 | Kras et al. |
| 10,659,488 B1 | 5/2020 | Rajasooriya et al. |
| 10,686,811 B1 | 6/2020 | Ehle |
| 10,749,890 B1 | 8/2020 | Aloisio et al. |
| 10,803,766 B1 | 10/2020 | Donovan et al. |
| 10,817,604 B1 | 10/2020 | Kimball et al. |
| 10,868,825 B1 | 12/2020 | Dominessy et al. |
| 10,949,338 B1 | 3/2021 | Sirianni et al. |
| 11,128,654 B1 | 9/2021 | Joyce et al. |
| 11,158,207 B1 | 10/2021 | Sadeh-Koniecpol et al. |
| 11,257,393 B2 | 2/2022 | Atencio et al. |
| 11,258,806 B1 | 2/2022 | Berninger et al. |
| 11,277,203 B1 | 3/2022 | McLinden et al. |
| 2002/0038430 A1 | 3/2002 | Edwards et al. |
| 2002/0073204 A1 | 6/2002 | Dutta et al. |
| 2002/0078382 A1 | 6/2002 | Sheikh et al. |
| 2002/0129264 A1 | 9/2002 | Rowland et al. |
| 2002/0162017 A1 | 10/2002 | Sorkin et al. |
| 2003/0056116 A1 | 3/2003 | Bunker et al. |
| 2003/0182582 A1 | 9/2003 | Park et al. |
| 2003/0236993 A1 | 12/2003 | McCreight et al. |
| 2004/0039921 A1 | 2/2004 | Chuang |
| 2004/0133672 A1 | 7/2004 | Bhattacharya et al. |
| 2005/0132225 A1 | 6/2005 | Gearhart |
| 2005/0138413 A1 | 6/2005 | Lippmann et al. |
| 2005/0165834 A1 | 7/2005 | Nadeau et al. |
| 2005/0193173 A1 | 9/2005 | Ring et al. |
| 2005/0193430 A1 | 9/2005 | Cohen et al. |
| 2005/0203921 A1 | 9/2005 | Newman et al. |
| 2006/0037076 A1 | 2/2006 | Roy |
| 2006/0104288 A1 | 5/2006 | Yim et al. |
| 2006/0109793 A1 | 5/2006 | Kim et al. |
| 2006/0167855 A1 | 7/2006 | Ishikawa et al. |
| 2006/0191010 A1 | 8/2006 | Benjamin |
| 2006/0248525 A1 | 11/2006 | Hopkins |
| 2006/0253906 A1 | 11/2006 | Rubin et al. |
| 2006/0271345 A1 | 11/2006 | Kasuya |
| 2007/0055766 A1 | 3/2007 | Petropoulakis et al. |
| 2007/0112714 A1 | 5/2007 | Fairweather |
| 2007/0143852 A1 | 6/2007 | Keanini et al. |
| 2007/0192863 A1 | 8/2007 | Kapoor et al. |
| 2008/0010225 A1 | 1/2008 | Gonsalves et al. |
| 2008/0167920 A1 | 7/2008 | Schmidt et al. |
| 2008/0183520 A1 | 7/2008 | Cutts et al. |
| 2008/0222734 A1 | 9/2008 | Redlich et al. |
| 2009/0007270 A1 | 1/2009 | Futoransky et al. |
| 2009/0113201 A1 | 4/2009 | Mackey et al. |
| 2009/0144827 A1 | 6/2009 | Peinado et al. |
| 2009/0150998 A1 | 6/2009 | Adelstein et al. |
| 2009/0158430 A1 | 6/2009 | Borders |
| 2009/0164522 A1 | 6/2009 | Fahey |
| 2009/0208910 A1 | 8/2009 | Brueckner et al. |
| 2009/0254572 A1 | 10/2009 | Redlich et al. |
| 2009/0288164 A1 | 11/2009 | Adelstein et al. |
| 2009/0319247 A1 | 12/2009 | Ratcliffe et al. |
| 2009/0319249 A1 | 12/2009 | White et al. |
| 2009/0319647 A1 | 12/2009 | White et al. |
| 2009/0319906 A1 | 12/2009 | White et al. |
| 2009/0320137 A1 | 12/2009 | White et al. |
| 2009/0328033 A1 | 12/2009 | Kohavi et al. |
| 2010/0010968 A1 | 1/2010 | Redlich et al. |
| 2010/0058114 A1 | 3/2010 | Perkins et al. |
| 2010/0082513 A1 | 4/2010 | Liu |
| 2010/0138925 A1 | 6/2010 | Barai et al. |
| 2010/0146615 A1 | 6/2010 | Locasto et al. |
| 2010/0284282 A1 | 11/2010 | Golic |
| 2010/0319069 A1 | 12/2010 | Granstedt et al. |
| 2011/0154471 A1 | 6/2011 | Anderson et al. |
| 2011/0177480 A1 | 7/2011 | Menon et al. |
| 2011/0282715 A1 | 11/2011 | Nguyen et al. |
| 2012/0198513 A1 | 8/2012 | Maida-Smith et al. |
| 2012/0210017 A1 | 8/2012 | Muhunthan et al. |
| 2012/0210427 A1 | 8/2012 | Bronner et al. |

(56) References Cited

U.S. PATENT DOCUMENTS

| | | |
|---|---|---|
| 2012/0258437 A1 | 10/2012 | Sadeh-Koniecpol et al. |
| 2013/0014264 A1 | 1/2013 | Kennedy et al. |
| 2013/0019312 A1 | 1/2013 | Bell et al. |
| 2013/0055404 A1 | 2/2013 | Khalili |
| 2013/0191919 A1 | 7/2013 | Basavapatna et al. |
| 2013/0273514 A1 | 10/2013 | Tambe et al. |
| 2013/0347085 A1 | 12/2013 | Hawthorn et al. |
| 2013/0347116 A1 | 12/2013 | Flores et al. |
| 2014/0046645 A1 | 2/2014 | White et al. |
| 2014/0099622 A1 | 4/2014 | Arnold et al. |
| 2014/0165138 A1 | 6/2014 | Maida-Smith et al. |
| 2014/0287383 A1 | 9/2014 | Willingham et al. |
| 2014/0321735 A1 | 10/2014 | Zhang et al. |
| 2014/0337971 A1 | 11/2014 | Casassa Mont et al. |
| 2015/0033346 A1 | 1/2015 | Hebert et al. |
| 2015/0050623 A1 | 2/2015 | Falash et al. |
| 2015/0106324 A1 | 4/2015 | Puri et al. |
| 2015/0163088 A1 | 6/2015 | Anschutz |
| 2015/0193695 A1 | 7/2015 | Cruz Mota et al. |
| 2015/0213260 A1 | 7/2015 | Park |
| 2015/0213730 A1 | 7/2015 | Brueckner et al. |
| 2015/0269383 A1 | 9/2015 | Lang et al. |
| 2015/0339477 A1 | 11/2015 | Abrams et al. |
| 2016/0028764 A1 | 1/2016 | Vasseur et al. |
| 2016/0099953 A1 | 4/2016 | Hebert et al. |
| 2016/0173495 A1 | 6/2016 | Joo |
| 2016/0188814 A1 | 6/2016 | Raghavan et al. |
| 2016/0205122 A1 | 7/2016 | Bassett |
| 2016/0219024 A1 | 7/2016 | Verzun et al. |
| 2016/0234242 A1 | 8/2016 | Knapp et al. |
| 2016/0246662 A1 | 8/2016 | Meng et al. |
| 2016/0285907 A1 | 9/2016 | Nguyen et al. |
| 2016/0307199 A1 | 10/2016 | Patel et al. |
| 2016/0330228 A1 | 11/2016 | Knapp et al. |
| 2016/0337400 A1 | 11/2016 | Gupta |
| 2017/0006055 A1 | 1/2017 | Strom et al. |
| 2017/0032694 A1 | 2/2017 | Brueckner et al. |
| 2017/0032695 A1 | 2/2017 | Brueckner et al. |
| 2017/0104778 A1 | 4/2017 | Shabtai et al. |
| 2017/0171230 A1 | 6/2017 | Leiderfarb et al. |
| 2017/0251010 A1 | 8/2017 | Irimie et al. |
| 2018/0048534 A1 | 2/2018 | Banga et al. |
| 2018/0068244 A1 | 3/2018 | Vashistha |
| 2018/0121657 A1 | 5/2018 | Hay et al. |
| 2018/0124108 A1 | 5/2018 | Irimie et al. |
| 2018/0129805 A1 | 5/2018 | Samuel |
| 2018/0139181 A1 | 5/2018 | Weinberger et al. |
| 2018/0150554 A1 | 5/2018 | Le et al. |
| 2018/0159894 A1 | 6/2018 | Reddy et al. |
| 2018/0191763 A1 | 7/2018 | Hillard et al. |
| 2018/0191770 A1 | 7/2018 | Nachenberg et al. |
| 2018/0219887 A1 | 8/2018 | Luo et al. |
| 2018/0225471 A1 | 8/2018 | Goyal et al. |
| 2018/0295154 A1 | 10/2018 | Crabtree et al. |
| 2018/0330253 A1 | 11/2018 | Gottschlich et al. |
| 2018/0367563 A1 | 12/2018 | Pfleger de Aguiar et al. |
| 2018/0375892 A1 | 12/2018 | Ganor |
| 2019/0014153 A1 | 1/2019 | Lang et al. |
| 2019/0034623 A1 | 1/2019 | Lowry et al. |
| 2019/0083876 A1 | 3/2019 | Morton et al. |
| 2019/0102564 A1 | 4/2019 | Li et al. |
| 2019/0164015 A1 | 5/2019 | Jones, Jr. et al. |
| 2019/0171822 A1 | 6/2019 | Sjouwerman et al. |
| 2019/0182273 A1 | 6/2019 | Walsh et al. |
| 2019/0188615 A1 | 6/2019 | Liu |
| 2019/0222593 A1 | 7/2019 | Craig et al. |
| 2019/0238583 A1 | 8/2019 | Vaidya |
| 2019/0258953 A1 | 8/2019 | Lang et al. |
| 2019/0289029 A1 | 9/2019 | Chawla et al. |
| 2019/0312890 A1 | 10/2019 | Perilli |
| 2019/0356684 A1 | 11/2019 | Sinha et al. |
| 2019/0370473 A1 | 12/2019 | Matrosov et al. |
| 2019/0379705 A1 | 12/2019 | Murphy et al. |
| 2020/0177617 A1 | 6/2020 | Hadar et al. |
| 2020/0184053 A1 | 6/2020 | Kursun |
| 2020/0184847 A1 | 6/2020 | Gabay et al. |
| 2020/0201992 A1 | 6/2020 | Hadar et al. |
| 2020/0233955 A1 | 7/2020 | Ramzan et al. |
| 2020/0358803 A1 | 11/2020 | Roelofs et al. |
| 2021/0168170 A1 | 6/2021 | Asai et al. |
| 2021/0203682 A1* | 7/2021 | Bajpai ............. G06F 21/55 |

FOREIGN PATENT DOCUMENTS

| | | |
|---|---|---|
| WO | WO-02/071192 A2 | 9/2002 |
| WO | WO-2017/105383 A1 | 6/2017 |

OTHER PUBLICATIONS

"Cybersecurity," U.S. Department of Defense Instruction, No. 8500. 01, Mar. 14, 2014, 58 pages,accessible via.https://www.esd.whs.mil/Portals/54/Documents/DD/issuances/dodi/850001_2014.pdf.

"Cyberspace Operations", U.S. Air Force, Air Force Policy Directive 10-17, Jul. 31, 2012, retrieved from URL: https://fas.org/irp/doddir/usaf/afpd10-17.pdf (9 pages).

"CYDEST: CYber DEfense Simulation Trainer", Air Force SBIR/STTR Award Details, Phase I, Award Details Status: Completed (Invited for Phase II) Start: Apr. 13, 2005 End Jan. 13, 2006, retrieved on Aug. 30, 2020 from URL: http://www.itfsbirsttr.com/award/AWARDDetails.aspx?pk=12036 (2 pages).

"Identification and Significance of the Problem or Opportunity", Architecture Technology Corporation, Proposal No. F172-D12-0184, Topic No. OSD172-D12, 10 pages (undated).

2015 DFRWS Forensics Challenge, "Submitted Solutions and Source Code Released", GPU Malware Research, retrieved on Mar. 22, 2020 from http://www.cs.uno.edu/-golden/gpumalware-research.html, 5 pages.

Architecture Technology Corporation et al.", Cydest (Cyber Defense Simulation Trainer),"http://web.archive.org/web/20061107010247/www.atcorp.com/securesystems/cydest.html, Dec. 2005, 1 page.

ATC-NY et al., "Cyber Defense Simulation Trainer (CYDEST)", CYDEST Congressional Briefing, Feb. 19, 2007, 1 page.

ATC-NY, OSD172-D11, F172-D11-0024, Phase 1 SBIR Proposal, "SilverlineRT", Jul. 20, 2017, 16 pages.

ATC-NY, SB172-007, D172-007-0014, Phase I SBIR Proposal, Silverline Human Performance Detection (Silverline-HPD), Jul. 20, 2017 (17 pages).

Atighetchi et al., "Metrinome-Continuous Monitoring and Security Validation of Distributed Systems", Journal of Cyber Security and Information Systems vol. II, No. 1, Knowledge Management, Mar. 2014, pp. 20-26.

Baloch et al., "Comparative Study of Risk Management in Centralized and Distributed Software Development Environment", Sci. Int.(Lahore), vol. 26, No. 4, 2014, pp. 1523-1528.

Balzarotti et al., "The Impact of GPU-Assisted Malware on Memory Forensics: A Case Study", DFRWS 2015, Elsevier, Digital Investigation, vol. 14, 2015, pp. S16-S24.

Becker et al., "Applying Game Theory to Analyze Attacks and Defenses in Virtual Coordinate Systems," 41st International Conference on Dependable Systems & Networks (DSN), Jun. 2011, pp. 133-142.

Bergstromb et al., "The Distributed Open Network Emulator: Using Relativistic Time for Distributed Scalable Simulation", Proceedings of the 20th Workshop on Principles of Advanced and Distributed Simulation, May 23-26, 2006, 7 pages.

Brueckner et al., "CYDEST Cyber Defense Simulation Trainer", ATC-NY a subsidiary of Architecture Technology Corporation, Oct. 29, 2007, 20 pages.

C.M.U. Entertainment Technology Center, "CyberSecurity", found at http://www.etc.cmu.edu/projects/cybersecurity/, Feb. 2000, 16 pages.

Carson et al., "NIST NET: A Linux-based network emulation tool" ACM SIGCOMM, Computer Communication Review, vol. 33, Issue 3, Jul. 2003, 16 pages.

Carver et al., "Military Academy Attack/Defense Network", IEEE Systems, Man, and Cybernetics Information Assurance and Security Workshop, West Point, NY, Jun. 17-19, 2002, 6 pages.

(56) References Cited

OTHER PUBLICATIONS

Challagulla et al., "Empirical Assessment of Machine Learning based Software Defect Prediction Techniques", Proceedings of the 10th IEEE International Workshop on Object-Oriented Real-Time Dependable Systems (WORDS'05), Feb. 2-4, 2005, 8 pages.

Crumb, Francis L., "Cyber Security Boot Camp graduates Class of '06", Academy Spirit, vol. 46, No. 33, Aug. 18, 2006, U.S. Air Force Academy, Colorado (1 page).

Crumb, Francis L., "Hackfest Highlights Cyber Security Boot Camp", Air Force Research Laboratory (AFRL) Information Directorate document, Oct./Nov. 2004 (1 page).

Davoli, "Virtual Square: all the virtuality you always wanted but you were afraid to ask," http://virtualsguare.org/copyright Renzo Davoli, May 27, 2004, 3 pages.

Davoli, "Virtual Square", Proceedings of the First International Conference on Open Source Systems, Genova, Jul. 11-15, 2005, 6 pages.

De Gusmao et al., "Abstract of Cybersecurity risk analysis model using fault tree analysis and fuzzy decision theory", 2018, International Journal of Information Management, pp. 1-3.

Duggirala et al., "Open Network Emulator", Jan. 15, 2005, available at URL: https://web.archive.org/web/2010*/http://csrl.cs.vt.edu/net_emulation.html (5 pages).

Edwards et al., "Hajime: Analysis of a decentralized internet worm for IoT devices", RapidityNetworks, Security Research Group, Oct. 16, 2016, pp. 1-18.

Final Office Action for U.S. Appl. No. 16/256,810 dated Jan. 24, 2022 (19 pages).

Final Office Action on U.S. Appl. No. 16/256,810 dated Jun. 3, 2021 (16 pages).

Fisher, "Developing Software in a Multicore & Multiprocessor World," Klocwork White Paper, Klocwork.com., Sep. 2010, pp. 1-11.

Home Invasion 2.0, "Attacking Network-Connected Embedded Devices", retrieved from the internet on Jun. 20, 2018, https://media.blackhat.com/us-13/US-13-Crowley-Home-Invasion-2-0-WP.pdf, 15 pages.

Honeynet Project, "Know Your Enemy: Defining Virtual Honeynets," http://old.honeynel.org/papers.virtual/, Jan. 27, 2003, 7 pages.

Howard et al., "A Common Language for Computer Security Incidents," Sandia National Laboratories Report, SAND9B 8667, Oct. 1998, 32 pages.

Ingoldsby, T. "Attack Tree-based Threat Risk Analysis" (2010) Amenaza Technologies Limited (2010): 3-9 (62 pages).

Jones, "Software Defect Origins and Removal Methods," International Function Point Users Group, Capers Jones, Dec. 28, 2012, pp. 1-31.

Joyce et al., "MEGA: A Tool for Mac OS X Operating System and Application Forensics," Digital Investigation, vol. 5, Elsevier, Proceedings of the Digital Forensic Research Conference, Aug. 11-13, 2008, pp. 583-590.

Joyce, "TrestleHSM: Hierarchical Security Modeling for Naval Control Systems", Phase 1 SBIR Proposal, Topic: N181-051, Unified Cybersecurity System Modeling of Naval Control Systems, Architecture Technology Corporation, 25 pages.

Keshav, "REAL: A Network Simulator," Computer Science Division, Department of Electrical Engineering and Computer Science, University of California, Berkeley, Dec. 1988, 16 pages.

Kimball, "Silverline Human Performance Detection (Silverline-HPD)", Phase 1 SBIR Proposal, Architecture Technology Corporation, SB172-007, D172-007-0014, Jul. 20, 2017, 17 pages.

Krishna et al., "V-Netlab: A Cost-Effective Platform to Support Course Projects in Computer Security", Department of Computer Science, Stony Brook University, Jun. 2005, 7 pages.

Lathrop et al., "Information Warfare in the Trenches: Experiences from the Firing Range," U.S. Military Academy, Security education and critical infrastructures, Kluwer Academic Publishers Norwell, MA, USA .copyright, Jun. 23-26, 2003, 21 pages.

Lathrop et al., "Modeling Network Attacks", 12th Conference on Behavior Representation in Modeling and Simulation, 2003, pp. 401-407 (8 pages).

Lathrop et al., "Modeling Network Attacks", 12th Conference on Behavior Representation in Modeling and Simulation, May 2003, pp. 19-26 (8 pages).

Libicki, "Cyberdeterrence and Cyberwar," Rand Corporation, Project Air Force, 2009, 240 pages.

Liljenstam et al., "RINSE: The Real-Time Immersive Network Simulation Environment for Network Security Exercises", Proceedings of the 19th Workshop on Principles of Advanced and Distributed Simulation (PADS), Jun. 2005, 10 pages.

Maciel, et al. "Impact of a DDOS Attack on Computer Systems: An approach based on an Attack Tree Model," 2018 Annual IEEE International Systems Conference (SysCon), Vancouver, BC, 2018, pp. 1-8.

McDonald, Chris, "A Network Specification Language and Execution Environment for Undergraduate Teaching", ACM SIGCSE Bulletin, vol. 23, Issue 1, Mar. 1991, DOI: 10.1145/107005.107012 (10 pages).

McGrath et al., "NetSim: A Distributed Network Simulation to Support Cyber Exercises", Institute for Security Technology Studies, Dartmouth College, Huntsville Simulation Conference, Mar. 9-11, 2004, Huntsville, Alabama, 6 pages.

McHale, "The Aegis Combat System's continuous modernization", Military Embedded Systems, Retrieved on Mar. 22, 2020 from http://mil-Embedded.com/articles/the-aegis-combat-systems-continuous-modernization/, 8 pages.

McLinden, "Segmented Attack Prevention System for IoT Networks (SAPSIN)", Abstract-SBIR Phase 1 Proposal, DoD SBIR 2017.2, Proposal No. F172-D12-0184, Topic No. OSD172-D12, 1 page (undated).

Non-Final Office Action for U.S. Appl. No. 16/012,695 dated Mar. 20, 2020 (11 pages).

Non-Final Office Action for U.S. Appl. No. 16/256,810 dated Feb. 10, 2021 (18 pages).

Non-Final Office Action for U.S. Appl. No. 16/256,810 dated Sep. 29, 2021 (19 pages).

Non-Final Office Action on U.S. Appl. No. 16/995,458 dated Mar. 23, 2022 (18 pages).

Notice of Allowance for U.S. Appl. No. 16/012,651 dated Apr. 8, 2020 (8 pages).

Notice of Allowance for U.S. Appl. No. 16/012,651 dated Feb. 20, 2020 (12 pages).

Notice of Allowance for U.S. Appl. No. 16/012,695 dated Jun. 29, 2020 (7 pages).

Notice of Allowance for U.S. Appl. No. 16/267,304 dated May 26, 2021 (9 pages).

Notice of Allowance on U.S. Appl. No. 16/455,254 dated Mar. 29, 2022.

Notice of Allowance on U.S. Appl. No. 16/256,810 dated Apr. 26, 2022 (13 pages).

Padman et al., "Design of a Virtual Laboratory for Information Assurance Education and Research", Proceedings of the 2002 IEEE, Workshop on Information Assurance and Security, U.S. Military Academy, West Point, Jun. 2002, 7 pages.

PORCHE III et al., "A Cyberworm that Knows no Boundaries", RAND Corporation, National Defense Research Institute, 2011, 55 pages.

PR Newswire, "ATCorp Releases CSAS—Cloud Security Analysis Suite for Applications in the Cloud", Architecture Technology Corporation, Feb. 26, 2016, 4 pages.

Proposal Author: Matthew Donovan; Topic Name and No. N182-131: Red Team in a Box for Embedded and Non-IP Devices; Title: Automated Cyber Evaluation System, Jun. 30, 2018, 24 pages.

Quinlan et al., "ROSE User Manual: A Tool for Building Source-to-Source Translators", Draft User Manual, Version 0.9.11.115, Lawrence Livermore National Laboratory, Sep. 12, 2019 (337 pages).

Quinlan et al., "Rose User Manual: A Tool for Building Source-to-Source Translators", Draft User Manual, Version D.9.6a, Lawrence Livermore National Laboratory, Dec. 16, 2015 (169 pages).

(56) References Cited

OTHER PUBLICATIONS

Rahman et al., "Defect Management Life Cycle Process for Software Quality Improvement," World Academy of Science, Engineering and Technology International Journal of Computer and Information Engineering, vol. 9, No. 12, 2015 3rd International Conference on Artificial Intelligence, Modelling and Simulation, Nov. 24, 2015, pp. 241-244.
Richard III, "Memory Analysis, Meet GPU Malware", University of New Orleans, CERIAS, Oct. 22, 2014, retrieved from URL: http://www.cerias.purdue.edu/news_and_events/events/security_seminar/details/index/popenihmencsf2v5mggg5ulfd4 (2 pages).
Richard III, Golden G., "Memory Analysis, Meet GPU Malware", CERIAS, Oct. 22, 2014, retrieved 2021 from URL: https://www.cerias.purdue.edu/news_and_events/events/security_seminar/details/index/popenihmencsf2v5mggg5ulfd4 (3 pages).
Robbio, "How Will AI Impact Software Development?", Forbes Technology Council, Aug. 31, 2017, retrieved on Mar. 23, 2020 from https://www.forbes.com/sites/forbestechcouncil/2017/08/31/how-will-ai-impact-software-development/#325be7e7264d, 16 pages.
ROSE: Main Page, Lawrence Livermore National Laboratory, retrieved on Mar. 23, 2020 from http://rosecompiler.org/ROSE_HTML_Reference/, 3 pages.
Saic et al., "TeamDefend, A White Paper on Strengthening the Weakest Link: Organizational Cyber Defense Training", 17th Annual FIRST Conference, Jun. 26-Jul. 1, 2005, 6 pages.
Saunders, "Simulation Approaches in Information Security Education", Proceedings of the Sixth National Colloquium for Information Systems Security Education, Redmond, Washington, Jun. 4-6, 2002, 15 pages.
Schafer et al., "The IWAR Range: A Laboratory for Undergraduate Information Assurance Education", Military Academy West Point, NY, Research paper, found at http://handle.dtic.mil/100.2/ADM08301, Nov. 7, 2000, 7 pages.
Schepens et al., "The Cyber Defense Exercise: an Evaluation of the Effectiveness of Information Assurance Education", 2003, 14 pages.
Schneier, B., "Attack Trees—Schneier on Security", Dr. Dobb's Journal, Dec. 1999, retrieved Mar. 23, 2020 from URL: https://www.schneier.com/academic/archives/1999/12/attack_trees.html (9 pages).
Shiva et al., "Game Theory for Cyber Security," Proceedings of the Sixth Annual Workshop on Cyber Security and Information Intelligence Research, Article No. 34, Apr. 2010, 10 pages.
Sirianni, "A19-080 Cyber Security Tool Kits For Engineers and Soldiers," Phase 1 SBIR Proposal, Architecture Technology Corporation, 24 pages (undated).
Sironi et al., "Metronome: Operating System Level Performance Management via Self-Adaptive Computing", DAC 2012, Jun. 3-7, 2012, pp. 856-865.
Snyder et al., "Ensuring U.S. Air Force Operations During Cyber Attacks Against Combat Support Systems—Guidance for Where to Focus Mitigation Efforts," RAND Corporation, 2015, 37 pages.
Stumpf et al., "NoSE-building virtual honeynets made easy", Darmstadt University of Technology, Department of Computer Science, D-64289 Darmstadt, Germany, 2005, 11 pages.
Stytz et al., "Realistic and Affordable Cyberware Opponents for the Information Warfare BattleSpace," Jun. 2003, 42 pages.
U.S. Notice of Allowance on U.S. Appl. No. 16/995,458 dated Jul. 14, 2022.
Varga, "The OMNeT ++ Discrete Event Simulation System", Department of Telecommunications, Budapest University of Technology and Economics, Proceedings of the European Simulation Multiconference, Jun. 2001, 7 pages.
Vasiliadis et al., "GPU-Assisted Malware", 2010 5th International Conference on Malicious and Unwanted Software, 2010, pp. 1-6.
Vrable et al., "Scalability, Fidelity, and Containment in the Potemkin Virtual Honeyfarm," SOSP, Oct. 23-26, 2005, 15 pages.
Wang et al., "The design and implementation of the NCTUns 1.0 network simulator", Computer Networks, vol. 42, Issue 2, Jun. 2003, 23 pages.
White et al., "Cyber Security Exercises: Testing an Organization's Ability to Prevent, Detect and Respond to Cyber Security Events," Proceeding of the 37th Hawaii International Conference on System Sciences, Jan. 2004, 10 pages.
Wikipedia-OpenCL, Mar. 29, 2017, Retrieved from https://en.wikipedia.org/wiki/OpenCL, 23 pages.
Wu et al., "An Attack Modeling Based on Hierarchical Colored Petri Nets", 2008 International Conference on Computer and Electrical Engineering, Phuket, 2008, pp. 918-921.
Xie et al., "Security Analysis on Cyber-Physical System Using Attack Tree", 2013 Ninth International Conference on Intelligent Information Hiding and Multimedia Signal Processing, IEEE Computer Society, IEEE, 2013, pp. 429-432, DOI: 10.1109/IIH-MSP.2013.113 (4 pages).
Xu et al., "A Minimum Defense Cost Calculation Method for Cyber Physical System", 2019 Seventh International Conference on Advanced Cloud and Big Data (CBD), IEEE, 2019, pp. 192-197, DOI: 10.1109/CBD.2019.00043 (6 pages).
Xu et al., "Attack Identification for Software-Defined networking based on attack trees and extension innovation methods," 2017 9th IEEE Intl. Conf. on Intelligent Data Acquisition and Advanced Computing Systems: Technology and Applications (IDAACS), Bucharest, 2017, pp. 485-489.
Zeng et al., "GloMoSim: A Library for Parallel Simulation of Large-scale Wireless Networks" ACM SIGSIM Simulation Digest, vol. 28, Issue 1, Jul. 1998, 8 pages.
Haque, Md Shariful, and Travis Atkison. "An evolutionary approach of attack graph to attack tree conversion." International Journal of Computer Network and Information Security 11.11 (2017): 1. (Year: 2017).
Homer, John, et al. "Aggregating vulnerability metrics in enterprise networks using attack graphs." Journal of Computer Security 21.4 (2013): 561-597. (Year: 2013).
Machine Translation of CN108780480 (Year: 2018).

* cited by examiner

100

AUTOMATED CYBER EVALUATION SYSTEM

CROSS-REFERENCE TO RELATED APPLICATIONS

This application is a continuation application of U.S. application Ser. No. 16/455,254, entitled "Portable Vulnerability Identification Tool for Embedded Non-IP Devices," filed Jun. 27, 2019, which is incorporated by reference in its entirety.

This application relates to U.S. application Ser. No. 16/012,651, filed Jun. 19, 2018, entitled "Systems and Methods for Improving the Ranking and Prioritization of Attack-Related Events," U.S. application Ser. No. 15/485,784, filed Apr. 12, 2017, entitled "Software Assurance System for Runtime Environments," and U.S. application Ser. No. 15/622,434, filed Jun. 14, 2017, entitled "Software Assurance for Heterogeneous Distributed Computing Systems," each of which is incorporated by reference in its entirety.

TECHNICAL FIELD

This application is generally directed to evaluating system vulnerabilities of embedded non-internet protocol (IP) devices and more specifically towards portable vulnerability assessment tools for embedded non-IP devices.

BACKGROUND

Complex structures such as ships, submarines, and airplanes use a multitude of embedded non-IP devices. Sensors and controllers form specific use digital devices within these structures that control or access physical devices and run custom-written firmware directly to interact with the hardware of the physical devices. For example, a fuel control unit for a gas turbine engine (e.g., a jet engine) regulates fuel flow to the engine based upon the power demanded by the operator by controlling a fuel valve using a custom-written firmware. These embedded non-IP devices do not communicate over traditional IP-based networks and typically have limited Input Output (I/O) interfaces. The interaction with these devices is generally through direct physical connection, e.g., a wired connection.

Although immune from attacks through the IP channel, these embedded non-IP devices are susceptible to a large range of other security vulnerabilities. The firmware controlling these devices often contain bugs that can be maliciously exploited to hack into these devices. Even without bugs, the firmware for these devices may have weak security protocols. For example, most embedded non-IP devices provide some form of console access for configuration or updates. While many devices incorporate some form of authentication, the encryption/password protection mechanisms in the firmware use weak algorithms, such as random number generator seeded with a constant value. Passwords therefore become easy to extract because such a random number generator generates a sequence of predictable, non-random numbers. Other devices lack defensive coding techniques that makes them vulnerable to buffer overflows and arbitrary code injection. Malicious actors can exploit these vulnerabilities to hack into the entire system containing these embedded non-IP devices.

Performing vulnerability assessments of embedded non-IP devices present numerous technical challenges. Because of the restricted, unconnected operating environment, traditional IP-based vulnerability assessment cannot be performed for these devices. Furthermore, the limited I/O interfaces may be associated with different protocols. In addition, the devices use different microcontroller chips that support different binary formats and instruction sets. These devices are also deployed on highly mobile systems (e.g., airplanes and ships) and may not be accessible to traditional, desktop-type commodity computing systems.

SUMMARY

What is therefore desired are portable vulnerability assessment tools for embedded non-IP devices that may be operable with embedded non-IP devices using different I/O protocols, binary formats, and/or instruction sets.

Embodiments described herein attempt to solve the aforementioned technical problems and may provide other solutions as well. In an illustrative embodiment, a portable vulnerability assessment device may include a plurality of wired connectors based upon a plurality of communication protocols. A wired connector may be selected based upon a communication protocol of an embedded non-IP device to transmit one or more test scripts to the embedded non-IP device. The portable device and an associated platform may provide an application programming interface (API) for a user to generate the test scripts. The portable device may include a machine learning model to suggest test scripts based on the previously created test scripts. The portable device may receive the firmware binaries of the embedded non-IP device based on the transmitted test scripts. The portable device may include modules for disassembling of the firmware binaries and for performing concrete and symbolic (concolic) execution of the firmware binaries. The portable device may identify the vulnerabilities (e.g., buffer overflows, programming flaws) in the embedded non-IP device based upon the disassembling and/or the concolic execution of the firmware binaries.

In one embodiment, a system comprises a plurality of interfaces configured to be connected to embedded non-Internet Protocol (IP) devices; an application programming interface (API) configured to be invoked by a test script; a non-transitory storage medium storing a plurality of computer program instructions; a processor electrically coupled to the non-transitory storage medium and configured to execute the plurality of computer program instructions to: transmit one or more test instructions to an embedded non-IP device based upon the test script through an interface of the plurality of interfaces; receive one or more binary files forming at least a portion of the firmware of the embedded non-IP device in response to the one or more test instructions; disassemble the one or more binary files to generate corresponding one or more assembly code files; perform a symbolic execution of the one or more binary files; and identify a first vulnerability in the embedded non-IP device based upon the one or more assembly code files and the symbolic execution of the one or more binary files.

In one embodiment, a method comprises transmitting, by a computer, one or more test instructions to an embedded non-IP device based upon a test script, the one or more test instructions being transmitted through an interface of a plurality of interfaces associated with the computer; receiving, by the computer through the interface, one or more binary files forming at least a portion of the firmware of the embedded non-IP device in response to the one or more test instructions; disassembling, by the computer, the one or more binary files to generate corresponding one or more assembly code files; performing, by the computer, a symbolic execution of the one or more binary files; and identifying, by the computer, a first vulnerability in the embedded non-IP device based upon the one or more assembly code files and the symbolic execution of the one or more binary files.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
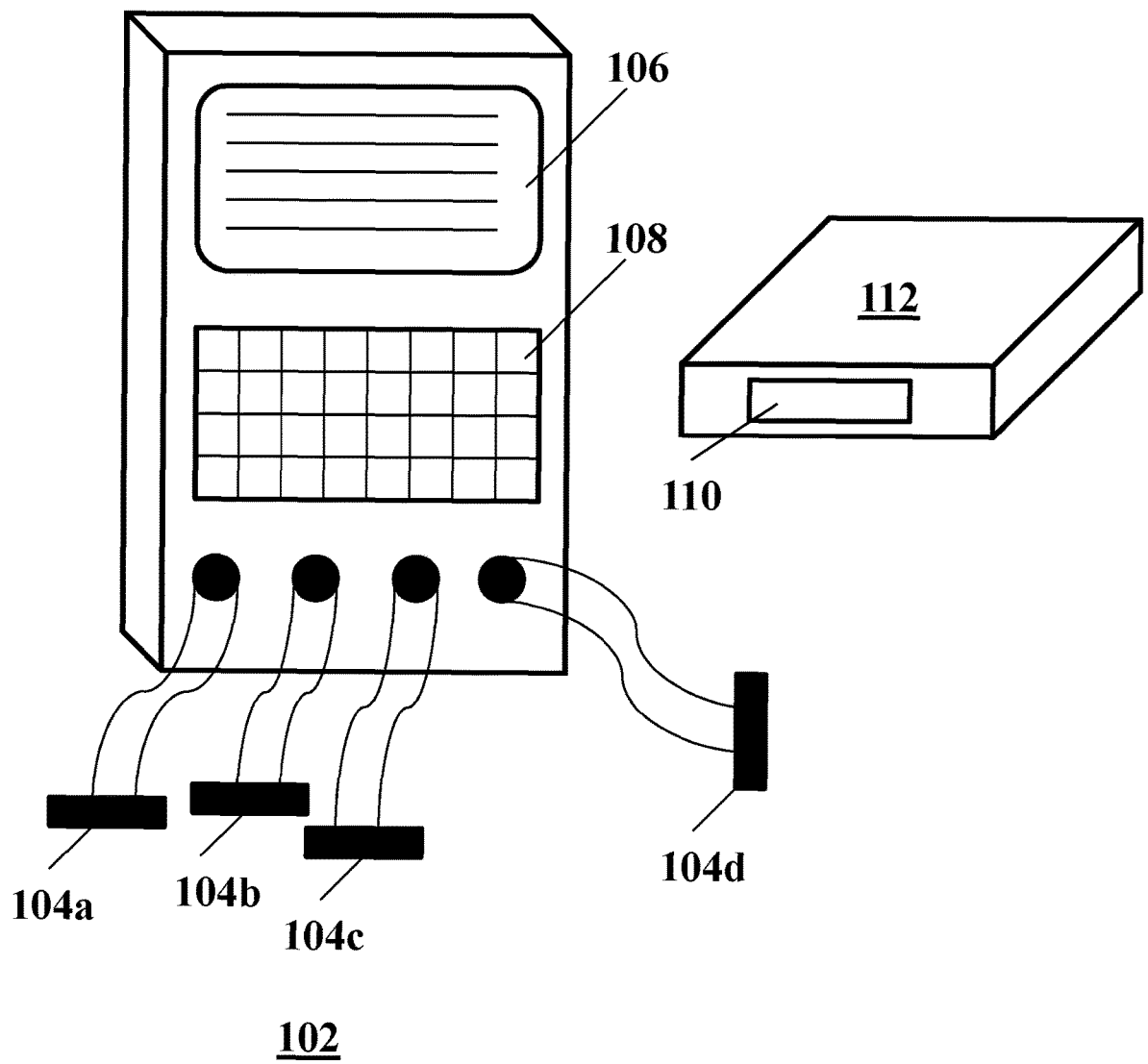
FIG. 1 shows an illustrative system for assessing vulnerabilities of an embedded non-IP device, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for assessing vulnerabilities of embedded non-IP devices. In an illustrative embodiment, a system of assessing the vulnerabilities of embedded non-IP devices may be within a portable device. The portable device may include a plurality of wired connectors for various wired communication/data transfer protocols. The portable device may include tools for analyzing the firmware binaries of the embedded non-IP devices, such as disassemblers and modules for concolic execution. Based upon the disassembly and the concolic execution, the portable device may identify vulnerabilities such as buffer overflows and programming flaws in the firmware binaries.

FIG. 1 shows an illustrative system 100 for vulnerability assessment of embedded non-IP devices, according to an embodiment. As shown, the illustrative system 100 may include a portable assessment device 102 and an embedded non-IP device 112. It should however be understood that the shown components are merely illustrative and additional, alternative, or fewer number of components should also be considered within the scope of this disclosure.

The portable assessment device 102 may be any kind of computing device. Non-limiting examples of the portable assessment device 102 may include a laptop computer, a tablet computer, a smartphone, and the like. The portable assessment device 102 may be a customized device that may not necessarily fit into the categorization of a laptop, a tablet, or a smartphone. Regardless of the form factor, the portable assessment device 102 may include a memory (not shown) and a processor (also not shown). The memory may store computer program instructions that may be executed by the processor. The processor may read the instructions and data from the memory, perform operations on the data based upon the instructions, and write a result back to the memory. In addition to the memory and the processor, the portable assessment device 102 may include a storage for a non-volatile storage of the computer program instructions, input data, and the results generated by the processor.

The portable assessment device 102 may include an interface 106 displaying text and/or graphics. The interface 106 may include a display of any type, including but not limited to Cathode Ray Tube (CRT), Liquid Crystal Display (LCD), plasma display, and Light Emitting Diode (LED) display. The interface 106 may display operational details when the portable assessment device 102 interacts with embedded non-IP device 112. The interface 106 may further provide a command line interface (CLI) for a user to enter one or more test/assessment commands. The interface 106 may also provide a graphical user interface (GUI) for the user to select graphical elements associated with the one or more test/assessment commands. The portable assessment device 102 may further include a keyboard 108 with a plurality of keys/buttons for the user to enter and/or select one or more test/assessment commands. It should be understood that the portable assessment device 102 may include other input tools or may be associated with (e.g., through wired/wireless connection) other input tools.

The portable assessment device 102 may further include wired connectors 104a-104d (collectively and commonly referred to as 104). The wired connectors 104 may be any kind of connector, including but not limited to, Universal Serial Bus (USB), Universal Asynchronous Receiver/Transmitter (UART), Joint Test Action Group (JTAG), Serial Peripheral Interface (SPI), a Recommended Standard (RS) 232, or an On-board Diagnostics (OBD). The portable assessment device 102 may include, in the storage and/or in the memory, instructions for the protocols supporting the communications through the wired connectors 104. It should be understood that the wired connectors 104 are merely illustrative and the portable assessment device may support wireless connections (e.g., Bluetooth) to communicate with the embedded non-IP device 112.

The embedded non-IP device 112 may be any type of device that may be a part of a larger, more complex system. For example, the embedded non-IP device 112 may be a part of a control system of a ship or an airplane. In the context of the airplane, the embedded non-IP device 112 may be a controller such as a fuel controller. The embedded non-IP device 112 may control the valve regulating the flow of fuel into the engine. An operator (e.g., a pilot) may not directly control the regulation of the fuel to the engine, the operator may provide an instruction for a requisite power to be delivered by the engine. Based on the instruction, the embedded non-IP device 112 may control the valve to regulate the fuel into the engine. Another example of embedded non-IP device 112 may include an engine control unit (ECU) in automobile. The embedded non-IP device may take in an input of various factors such as temperature of the engine of the automobile, speed of the automobile, how far the throttle has been engaged, and other factors to control the flow of fuel into the engine.

The embedded non-IP device 112 may be a highly customized computing device that operates in a specific, restricted environment without a connection to the Internet or any other large network. Therefore, the embedded non-IP device 112 may not be reachable by traditional IP channels. Interaction with the embedded non-IP device 112 may only be possible through one or more interfaces (an illustrative interface 110 is shown in FIG. 1). The interface 110 may receive a wired connector 104. The wired connector 104 may be selected based upon the communication protocol of the interface 110. As described above, the embedded non-IP device 112 may be reachable through a local wireless connection such as Bluetooth.

Figure 2:
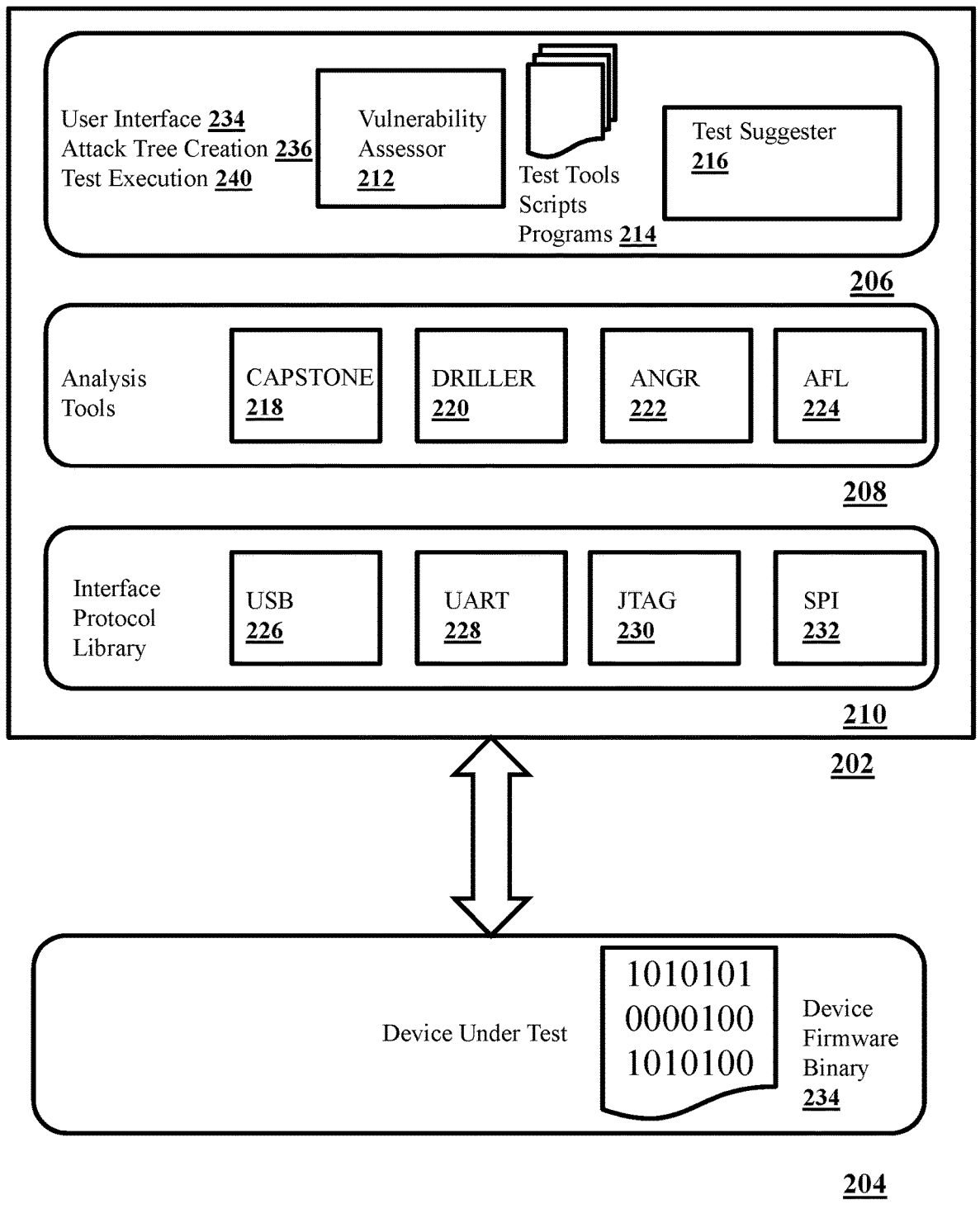
FIG. 2 shows a block diagram of an illustrative system for assessing vulnerabilities of an embedded non-IP device, according to an embodiment.

FIG. 2 shows a block diagram of an illustrative system 200 for assessing vulnerability of an embedded non-IP device, according to an embodiment. As shown, the illustrative system 200 may include an embedded non-IP device (also referred to as a device under test (DUT) 204) and a portable vulnerability assessment device 202. It should be understood that the shown components are merely illustrative, and additional, alternative, and fewer number of components should be considered within the scope of this disclosure.

The vulnerability assessment device 204 may include a user interaction module 206, analysis tools 208, and an interface protocol library 210. It should however be understood that these components in the vulnerability assessment device 204 are merely illustrative and additional, alternative, and fewer number of components should be considered within the scope of this disclosure. The user interaction module 206 may include a user interface 234. The user interface 234 may include, for example, a command line interface (CLI) or a graphical user interface (GUI). Through the CLI and/or the GUI, the user may provide a plurality of instructions to the vulnerability assessment device 204 for the vulnerability assessment device 204 to execute vulnerability assessment operations. In some embodiments, the user interface 234 may also include (or may be defined by) an application programming interface (API). The API may provide a user an interface to develop test scripts. In other words, the test scripts may invoke the API. A test script may include a plurality of test instructions.

The user interaction module 206 may further comprise an attack tree creation sub-module 236. An attack tree may define and describe an operational hierarchy of hardware and software components. For example, a hierarchically higher hardware components may have hierarchically lower hardware sub-components. The attack tree may show the operational relationships of the hierarchical components. More specifically, the attack tree may indicate how if hierarchically lower components are compromised, the hierarchically higher components may be compromised. Attack trees are disclosed in U.S. application Ser. No. 16/012,651, filed Jun. 19, 2018, titled "Systems and Methods for Improving the Ranking and Prioritization of Attack-Related Events," U.S. application Ser. No. 15/485,784, filed Apr. 12, 2017, titled "Software Assurance System for Runtime Environments," and U.S. application Ser. No. 15/622,434, filed Jun. 14, 2017, titled "Software Assurance for Heterogeneous Distributed Computing Systems," each of which is hereby incorporated by reference in its entirety. A test execution sub-module 240 within the user interaction module 206 may execute test scripts on the DUT 204. More specifically, the test execution sub-module 240 may provide test instructions to the DUT 204.

A vulnerability assessor sub-module 212 may perform vulnerability assessment of the DUT 204 utilizing the test tools, scripts, and programs 214. The vulnerability assessor sub-module 202 may utilize the test execution sub-module 240 to transmit the test tools, scripts, and programs 214 to the DUT 204. A test suggester sub-module 216 may suggest test scripts based upon previously provided test scripts. The test suggester sub-module 216 may use a machine learning module to suggest the test scripts. More specifically, the test suggester sub-module 216 may continuously monitor the test tools, scripts, and programs 214 received through the user interface 234. Based upon the pattern of the test tools, scripts, and programs 214, the machine learning model in the test suggester sub-module 216 may recommend a new test tools, scripts or programs 214. The test-suggester sub module 216 may display the recommend test tools, scripts, or programs 214 in the user interface 234. The test tool, scripts, or programs may invoke an API.

The analysis tools 208 may include a plurality of analysis sub-modules, including but not limited to a capstone sub-module 218, a driller sub-module 220, an Angr sub-module 222, and an American Fluffy Lop (AFL) sub-module 224. The capstone sub-module 218 may be a disassembler. The disassembler may be a lightweight tool for disassembling assembly language from an executable (binary) file. The capstone sub-module 218 may support a plurality of processor architectures that are used in embedded non-IP devices (e.g., DUT 204), including but not limited to Advanced RISC Machine (ARM), ARM64, Microprocessor without Interlocked Pipeline Stages (MIPS), and x86. The vulnerability assessment device 202 may use the information about a binary file extracted based upon the disassembly operation of the capstone sub-module 218 to identity vulnerabilities within the device firmware binary 234.

The driller sub-module 220 may perform a symbolic execution of at least a portion of the device firmware binary 234. The driller sub-module 220 may rely on an application fuzzing approach using the symbolic execution. The driller sub-module 220 may provide an improvement upon on standard fuzz testing that is confined to user-visible interfaces and inputs. The driller sub-module 220 may instead enable the vulnerability assessment device 202 to fuzz test internal function/method calls within an application. The driller sub-module 202 may therefore find bugs and vulnerabilities in the device firmware binary 234 that may not be found using standard testing methodologies.

The Angr sub-module 222 may perform symbolic execution of the device firmware binary 234. The Angr sub-module 222 may further generate a call-graph based on the method calls within the firmware binary 234. The Angr sub-module 222 may further perform concrete and symbolic (concolic) execution of the firmware binary 234 to identify vulnerabilities such as buffer overflows and programming flaws that may lead to arbitrary code execution. The AFL sub-module 224 may provide a fuzz testing functionality to test crashes, failing built-in code assertions, and memory leaks of the device firmware binary 234.

The interface protocol library 210 may support of plurality of interfaces to connect the vulnerability assessment device 202 with the DUT 204. The interface protocol library 210 may include software modules for Universal Serial Bus (USB) protocol 226, Universal Asynchronous Receiver/Transmitter (UART) protocol 228, Joint Test Action Group (JTAG) protocol 230, and Serial Peripheral Interface (SPI)

protocol, 232. It should however be understood that the aforementioned protocols 226, 228, 230, 232 supported by the interface protocol library 210 are merely illustrative, and additional, alternative, and fewer number of protocols should be considered within the scope of this disclosure. Other protocol examples may be a Recommended Standard (RS) 232 protocol or an On-board Diagnostics (OBD) protocol.

In operation, a processor in the vulnerability assessment device 202 may execute a protocol based upon a wired connection between the vulnerability assessment device 202 and the DUT 204. For example, if the wired connection between the vulnerability assessment device 202 and the DUT 202 is a USB cable, the processor may execute the USB protocol 226. The processor may detect the wired connection and automatically retrieve and execute one or more protocols 226, 228, 230, 232 based upon the detected wired connection. Therefore, the vulnerability assessment device 202 may seamlessly communicate with the DUT 204 because the processor may automatically detect the wired connection and execute one or more corresponding protocols 226, 228, 230, 232.

Figure 3:
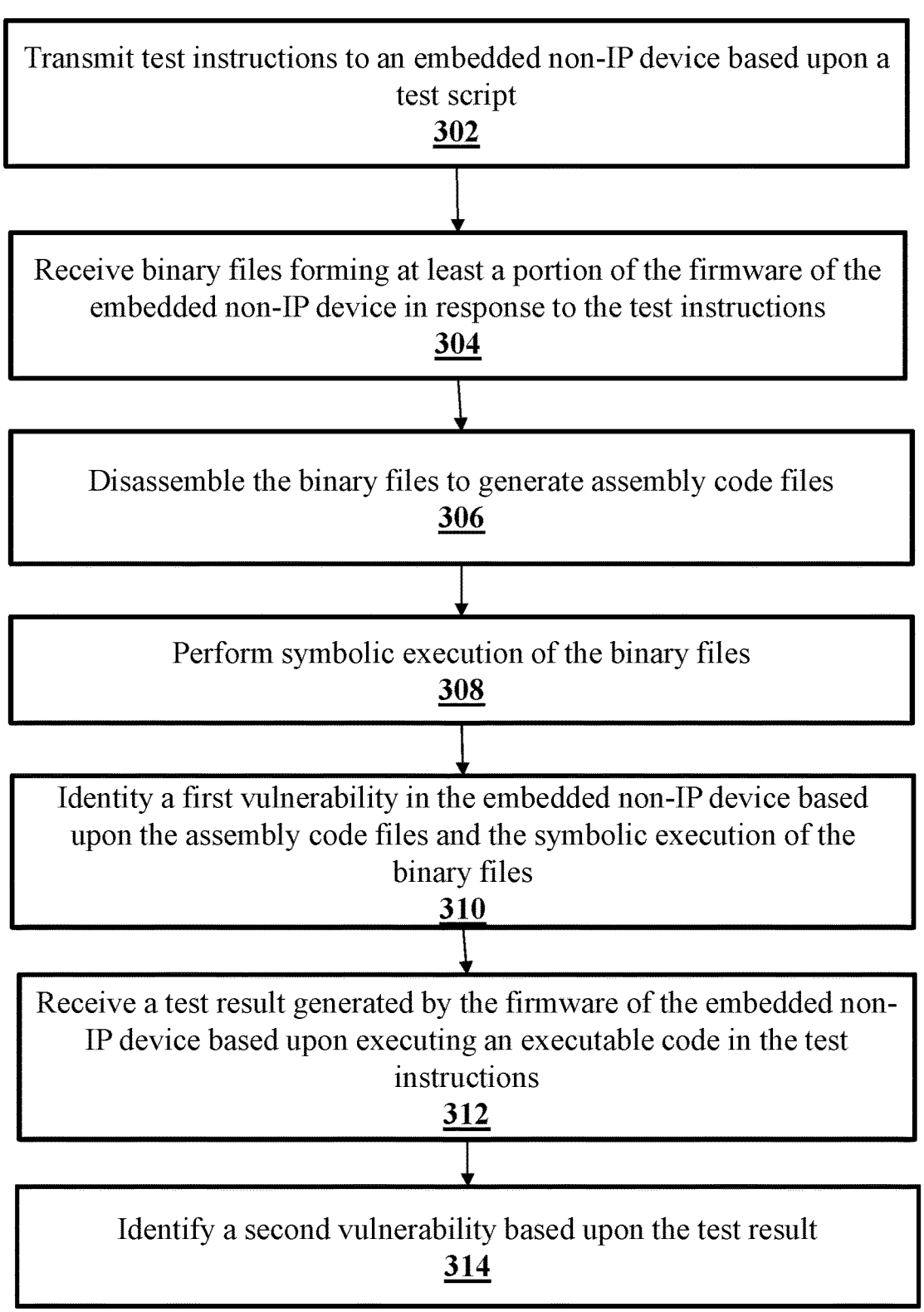
FIG. 3 shows a flow diagram of an illustrative method of assessing vulnerabilities of an embedded non-IP device, according to an embodiment.

FIG. 3 shows a flow diagram of an illustrative method 300 assessing vulnerability of embedded non-IP devices, according to an embodiment. It should be understood that the steps shown in FIG. 3 and described herein are more illustrative and additional, alternate, or fewer number of steps should be considered within the scope of this disclosure. Although multiple computing devices and their constituent components may perform one or more steps of the method 300, this description details a single computer performing all the steps of the method 300. An illustrative computer may be a portable vulnerability assessment tool.

The method may begin at step 302, where the computer may transmit test instructions to an embedded non-IP device based upon a test script. The test script may be provided by a user through an application programming interface (API). The test script may include a plurality of test instructions. The test instructions may be configured to interact with the firmware of the embedded non-IP device. For example, the firmware of the embedded non-IP device may execute a test instruction. As another example, the test instructions may be for the embedded non-IP device to send a response to the computer. The computer may transmit the test instructions to the embedded non-IP device through at least one of the wired connectors. Non limiting examples of the wired connectors include USB, UART, JTAG, SPI, RS-22, and OBD. The connection of the computer to the embedded non-IP device may be based upon the connection ports of the embedded non-IP device. For the embedded non-IP device containing a USB port, the computer may communicate with (e.g., transmit the test instruction) to the embedded non-IP device through a USB port of the computer and utilizing the USB protocol. The computer may automatically detect the type of connection and execute a corresponding connection protocol.

At step 304, the computer may receive one or more binary files forming at least a portion of the firmware of the embedded non-IP device. The computer may receive the one or more binary files in response to the test instructions. For example, the test instructions may instruct the firmware to transmit the portion of the firmware back to the computer. It should be understood that the computer may execute one or more authentication processes to authenticate with the embedded non-IP device to receive the one or more binary files.

At step 306, the computer may disassemble the one or more binary files to generate on or more corresponding assembly code files. For example, the computer may use a capstone disassembler to generate the assembly code. The assembly code may include assembly instructions corresponding the binary instructions in the one or more binary files.

At step 308, the computer may perform a symbolic execution of the one or more binary files. In particular, the computer may follow the program using an interpreter with symbolic values as inputs. The computer may determine a correspondence between the symbolic inputs and a portion of the program that may be activated (for execution) based on the symbolic inputs. By performing the symbolic execution, the computer may determine buffer overflows and programming overflows that may lead to an arbitrary code execution. In some embodiments, the computer may perform concolic execution of the one or more binary files.

At step 310, the computer may identify a first vulnerability in the embedded non-IP device based upon the one or more assembly code files and the symbolic execution of the one or more binary files. For example, the computer may identify the first vulnerability based upon the program flow in the assembly code files. As another example, the computer may identify the first vulnerability based upon symbolic/concolic execution. As yet another example, the computer may identify the first vulnerability based upon the combination of the one or more assembly code files and the symbolic execution of the one or more binary files. The vulnerabilities may include, for example, buffer and stack overflows, arbitrary code execution, and weak security and encryption protocols.

At step 312, the computer may receive a test result generated by the firmware of the embedded non-IP device. The embedded non-IP device may generate the test result by executing an executable code in the test instructions. For example, the test instructions may include an executable code to encrypt a password, and the test result may be an encrypted password. At step 314, the computer may identify a second vulnerability based upon the test result. The second vulnerability may include, for example, a weak encryption protocol.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for identifying device vulnerabilities, the method comprising:
   receiving, by a processor of an assessment device, from an embedded non-IP device one or more binary files of firmware of the embedded non-IP device;
   generating, by the processor, one or more assembly code files by disassembling the one or more binary files received from the embedded non-IP device; and
   identifying, by the processor, one or more vulnerabilities of the firmware of the embedded non-IP device based upon the one or more assembly code files disassembled from the one or more binary files of the firmware of the embedded non-IP device.

2. The method according to claim 1, wherein receiving the one or more binary files of the firmware includes transmitting, by the processor, one or more test instructions to the embedded non-IP device comprising executable code configured to be executed by the firmware of the embedded non-IP device, and
   wherein the processor receives the one or more binary files from the embedded non-IP device in accordance with the one or more testing instructions.

3. The method according to claim 2, further comprising:
   receiving, by the processor, a test result generated by the firmware of the embedded non-IP device based upon executing the executable code; and
   identifying, by the processor, a second vulnerability of the firmware of the embedded non-IP device based upon the test result.

4. The method according to claim 2, further comprising executing, by the processor, a machine learning model for identifying a suggested test script from a plurality of test scripts comprising executable code for execution by the firmware of the embedded non-IP device.

5. The method according to claim 2, wherein the processor transmits the one or more test instructions through an interface of a plurality of interfaces coupling the processor to the embedded non-IP device.

6. The method according to claim 2, further comprising receiving, by the processor, a test script comprising the one or more test instructions developed according to one or more inputs of a user interface.

7. The method according to claim 2, wherein the one or more test instructions are based upon at least one of: a type of the embedded non-IP device, or a type of interface coupling the processor to the embedded non-IP device.

8. The method according to claim 1, wherein identifying the one or more vulnerabilities of the firmware includes executing, by the processor, the one or more binary files received from the embedded non-IP device, and
   wherein the processor identifies a vulnerability of the embedded non-IP device based upon executing the one or more binary files.

9. The method according to claim 1, further comprising sorting, by the processor, the one or more vulnerabilities based upon one or more corresponding priorities of the one or more vulnerabilities.

10. The method according to claim 9, further comprising generating, by the processor, a user interface for displaying a priority list including the one or more vulnerabilities sorted according to the one or more corresponding priorities.

11. A system comprising:
a plurality of interfaces for connecting a processor to an embedded non-IP device; and
the processor in communication with the embedded non-IP device via an interface of the plurality of interfaces:
receive from an embedded non-IP device one or more binary files of firmware of the embedded non-IP device;
generate one or more assembly code files by disassembling the one or more binary files received from the embedded non-IP device; and
identify one or more vulnerabilities of the firmware of the embedded non-IP device based upon the one or more assembly code files disassembled from the one or more binary files of the firmware of the embedded non-IP device.

12. The system according to claim 11, wherein, when receiving the one or more binary files of the firmware, the processor is further configured to transmit one or more test instructions to the embedded non-IP device comprising executable code for execution by the firmware of the embedded non-IP device, and
wherein the processor receives the one or more binary files from the embedded non-IP device in accordance with the one or more testing instructions.

13. The system according to claim 12, wherein the processor is further configured to:
receive a test result generated by the firmware of the embedded non-IP device based upon executing the executable code; and
identify a second vulnerability of the firmware of the embedded non-IP device based upon the test result.

14. The system according to claim 12, wherein the processor is further configured to execute a machine learning model identifying a suggested test script from a plurality of test scripts comprising executable code for execution by the firmware of the embedded non-IP device.

15. The system according to claim 12, wherein the processor is configured to transmit the one or more test instructions through the interface of the plurality of interfaces connecting the processor to the embedded non-IP device.

16. The system according to claim 12, wherein the processor is further configured to receive a test script comprising the one or more test instructions developed according to one or more inputs of a user interface.

17. The system according to claim 12, wherein the one or more test instructions are based upon at least one of: a type of the embedded non-IP device, or a type of interface coupling the processor to the embedded non-IP device.

18. The system according to claim 11, wherein, when identifying the one or more vulnerabilities of the firmware, the processor is further configured to execute the one or more binary files received from the embedded non-IP device, and
wherein the processor identifies a vulnerability of the embedded non-IP device based upon executing the one or more binary files.

19. The system according to claim 11, wherein the processor is further configured to sort the one or more vulnerabilities based upon one or more corresponding priorities of the one or more vulnerabilities.

20. The system according to claim 19, wherein the processor is further configured to generate a user interface for displaying a priority list including the one or more vulnerabilities sorted according to the one or more corresponding priorities.

* * * * *